(12) United States Patent
Matsukawa (10) Patent No.: US 10,299,144 B2
(45) Date of Patent: May 21, 2019

(54) BASE STATION APPARATUS AND CONTROL METHOD THEREFOR

(71) Applicant: Panasonic Intellectual Property Management Co., Ltd., Osaka (JP)

(72) Inventor: Junya Matsukawa, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/754,275

(22) PCT Filed: May 18, 2016

(86) PCT No.: PCT/JP2016/002428
§ 371 (c)(1),
(2) Date: Feb. 21, 2018

(87) PCT Pub. No.: WO2017/037966
PCT Pub. Date: Mar. 9, 2017

(65) Prior Publication Data
US 2018/0242168 A1  Aug. 23, 2018

(30) Foreign Application Priority Data
Aug. 31, 2015  (JP) ................................ 2015-170233

(51) Int. Cl.
*H04W 16/28* (2009.01)
*H04B 7/10* (2017.01)
(Continued)

(52) U.S. Cl.
CPC .......... *H04W 16/28* (2013.01); *H04B 7/0617* (2013.01); *H04B 7/10* (2013.01);
(Continued)

(58) Field of Classification Search
CPC combination set(s) only.
See application file for complete search history.

(56) References Cited

U.S. PATENT DOCUMENTS

| 9,137,822 | B2* | 9/2015 | Sutivong | ................ H04L 1/1692 |
| 2002/0034967 | A1* | 3/2002 | Taniguchi | ............. H04W 16/28 455/562.1 |
| 2009/0075678 | A1* | 3/2009 | Ogoro | ..................... G01S 11/10 455/456.6 |
| 2009/0247182 | A1* | 10/2009 | Tamate | ............... H04W 72/082 455/452.2 |

(Continued)

FOREIGN PATENT DOCUMENTS

| JP | 2003-224510 | 8/2003 |
| JP | 3887586 B2 | 2/2007 |

OTHER PUBLICATIONS

International Search Report of PCT application No. PCT/JP2016/002428 dated Aug. 2, 2016.

*Primary Examiner* — Andrew Wendell
(74) *Attorney, Agent, or Firm* — Seed IP Law Group LLP (57) ABSTRACT

A base station apparatus in a point-to-multi point radio communication system includes a directional antenna, a terminal station apparatus direction calculator, an antenna direction calculator, and an antenna direction adjuster. The directional antenna has directivity. The terminal station apparatus direction calculator calculates directions of the plurality of terminal station apparatuses relative to a position of the base station apparatus based on positions of the plurality of terminal station apparatuses and the position of the base station apparatus. The antenna direction calculator calculates a direction toward which the directional antenna should be oriented based on the directions of the plurality of terminal station apparatuses, channel quality of each of the plurality of terminal station apparatuses, necessary channel quality indicating the channel quality required by each of the plurality of terminal station apparatuses, and a directional pattern of the directional antenna. The antenna direction adjuster orients the directional antenna toward the direction.

15 Claims, 5 Drawing Sheets

(51) Int. Cl.
*H04B 7/04* (2017.01)
*H04W 4/90* (2018.01)
*H04B 7/06* (2006.01)
*H04W 64/00* (2009.01)
*H04W 72/08* (2009.01)
*H04W 72/10* (2009.01)
*H04W 76/50* (2018.01)
*H04L 1/00* (2006.01)

(52) U.S. Cl.
CPC .......... *H04W 4/90* (2018.02); *H04W 64/003* (2013.01); *H04W 72/08* (2013.01); *H04W 72/10* (2013.01); *H04L 1/0026* (2013.01); *H04W 76/50* (2018.02)

(56) References Cited

U.S. PATENT DOCUMENTS

| | | | | |
|---|---|---|---|---|
| 2011/0124346 A1* | 5/2011 | Kobayashi | ............ | H04W 16/28 |
| | | | | 455/452.2 |
| 2011/0244883 A1* | 10/2011 | Quade | ............ | G01S 5/08 |
| | | | | 455/456.1 |
| 2012/0182910 A1* | 7/2012 | Nakashima | ............ | H04L 5/0057 |
| | | | | 370/281 |
| 2012/0327909 A1* | 12/2012 | Koike | ............ | H04W 24/08 |
| | | | | 370/331 |
| 2013/0072244 A1* | 3/2013 | Jeong | ............ | H04B 7/0617 |
| | | | | 455/509 |

* cited by examiner

BASE STATION APPARATUS AND CONTROL METHOD THEREFOR

This application is a U.S. national stage application of the PCT International Application No. PCT/JP2016/002428 filed on May 18, 2016, which claims the benefit of foreign priority of Japanese patent application 2015-170233 filed on Aug. 31, 2015, the contents all of which are incorporated herein by reference.

TECHNICAL FIELD

The present disclosure relates to a base station apparatus and a control method therefor.

BACKGROUND ART

A portable terminal station apparatus is used in a fixed radio communication system, which performs radio communication while installation places of a base station apparatus and a terminal station apparatus are fixed. The installation place of the portable terminal station apparatus is not always fixed, but can be moved while mounted on a vehicle or the like. Therefore, the portable terminal station apparatus can perform radio communication with the base station apparatus while a destination is set to a new installation place.

The fixed radio communication system using the portable terminal station apparatus is effective, for example, for temporarily providing a communication channel at a time of disaster, because the communication channel can easily be constructed in a required place.

A changeover from a conventional P-P (point-to-point) system to a P-MP (point-to-multi point) system is being considered in the fixed radio communication system using the portable terminal station apparatus in the P-P system, one base station apparatus communicates with one terminal station apparatus. In the P-MP system, one base station apparatus communicates with a plurality of terminal station apparatuses.

In the fixed radio communication system, a directional antenna is used in not only the terminal station apparatus but also the base station apparatus in order to send a radio wave to the plurality of terminal station apparatuses located far away.

For example, a technique disclosed in PTL 1 is as follows. In the P-MP system, a terminal station determines whether a reception level of the terminal station is normal or abnormal based on information (for example, a distance between a base station and the terminal station) input from a maintenance terminal connected to the terminal station, and the terminal station informs a maintenance person of a determination result by notifying the terminal station or the maintenance terminal of the determination result. This technique enables the maintenance person to adjust an antenna direction of the terminal station.

PTL 2 discloses a configuration in which an inspection hole is provided in a parabolic antenna of the terminal station in the P-MP system. In the configuration of PTL 2, the maintenance person can adjust the antenna direction with respect to a position of a communication target such as the base station apparatus while looking through the inspection hole.

CITATION LIST

Patent Literatures

PTL 1: Unexamined Japanese Patent Publication No. 2003-224510

PTL 2: Japanese Patent No. 3887586

SUMMARY OF THE INVENTION

However, in the technique of PTL 1, the terminal station notifies the maintenance person only of the information indicating whether the reception level is normal or abnormal, and cannot notify the maintenance person of how much adjustment of the antenna direction is necessary. Therefore, the maintenance person cannot adjust the antenna direction properly. Additionally, it takes a lot of time and labor because the maintenance person needs to manually adjust the antenna direction.

In the configuration of PTL 2, an indicator for adjusting the antenna direction is the position of the communication target looked through the inspection hole, and thus, the maintenance person cannot adjust the antenna direction properly, for example, when the communication target is located far away. Additionally it takes a lot of time and labor because the maintenance person needs to manually adjust the antenna direction. In the P-MP system, the base station apparatus that performs radio communication with the plurality of terminal station apparatuses has a plurality of communication targets, thus it cannot adjust the directional antenna of the base station apparatus properly.

An object of the present invention is to provide a base station apparatus that can properly adjust the antenna direction and a control method for the base station apparatus, in a point-to-multi point radio communication system including the base station apparatus having a directional antenna and a plurality of terminal station apparatuses.

A base station apparatus of the present invention is a base station apparatus in a point-to-multi point radio communication system in which the base station apparatus and a plurality of terminal station apparatuses communicate with each other. The base station apparatus includes a directional antenna, a terminal station apparatus direction calculator, an antenna direction calculator, and an antenna direction adjuster. The directional antenna has directivity. The terminal station apparatus direction calculator calculates directions of the plurality of terminal station apparatuses relative to a position of the base station apparatus based on positions of the plurality of terminal station apparatuses and the position of the base station apparatus. The antenna direction calculator calculates a direction toward which the directional antenna should be oriented based on directions of the plurality of terminal station apparatuses, channel quality of each of the plurality of terminal station apparatuses, necessary channel quality indicating the channel quality required by each of the plurality of terminal station apparatuses, and a directional pattern of the directional antenna. The antenna direction adjuster orients the directional antenna toward the direction toward which the directional antenna should be oriented.

A base station apparatus control method of the present invention is the base station apparatus control method in a point-to-multi point radio communication system in which a base station apparatus including a directional antenna having directivity and a plurality of terminal station apparatuses communicate with each other. The control method includes calculating directions of the plurality of terminal station apparatuses relative to a position of the base station apparatus based on positions of the plurality of terminal station apparatuses and the position of the base station apparatus. The control method includes calculating a direction toward which the directional antenna should be oriented based on directions of the plurality of terminal station apparatuses, channel quality of each of the plurality of terminal station apparatuses, necessary channel quality indicating the channel quality required by each of the plurality of terminal station apparatuses, and a directional pattern of the directional antenna. The control method includes orienting the directional antenna toward the direction toward which the directional antenna should be oriented.

DESCRIPTION OF EMBODIMENT

Hereinafter, an exemplary embodiment of the present invention will be described in detail with reference to the drawings. The following exemplary embodiment is an example, but the present invention is not limited to the exemplary embodiment.

Exemplary Embodiment

Figure 1:
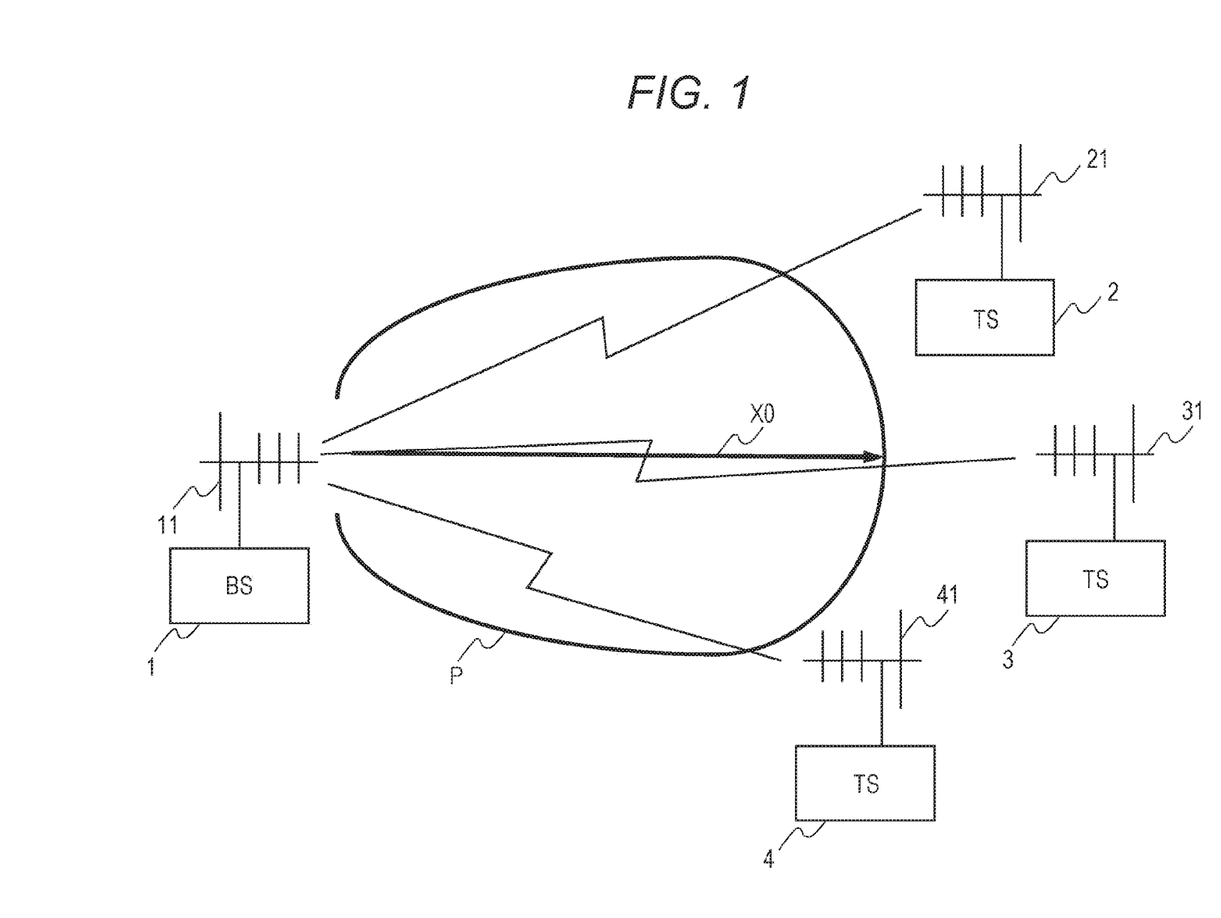
FIG. 1 is a diagram illustrating an example of a state of a fixed radio communication system according to an exemplary embodiment of the present invention.

FIG. 1 is a diagram illustrating an example of a state of a fixed radio communication system according to an exemplary embodiment of the present invention. FIG. 1 illustrates base station apparatus (BS) 1 including antenna 11, terminal station apparatus (TS) 2 including antenna 21, terminal station apparatus 3 including antenna 31, and terminal station apparatus 4 including antenna 41.

Base station apparatus 1 is a base station apparatus of which an installation place is fixed. Antenna 11 is a directional antenna having directional pattern P. For example, antenna 11 is a Yagi antenna. A front face of antenna 11 is oriented toward a direction of arrow X0. For the example in FIG. 1, antenna 11 has directional pattern P in which a front direction (the direction of arrow X0) provides the maximum radiation characteristic. Hereinafter, the front direction (the direction of arrow X0) of antenna 11 is described as a reference direction of antenna 11.

Each of terminal station apparatuses 2 to 4 is a portable terminal station apparatus, which moves while being mounted on a vehicle or the like. Each of antennas 21 to 41 is a directional antenna having a predetermined directional pattern. For example, antennas 21 to 41 are a Yagi antenna. Each of antennas 21 to 41 may be an antenna having a different directional pattern. A direction of each of antennas 21 to 41 is adjusted so as to perform high-quality communication with base station apparatus 1, based on the directional pattern.

As illustrated in FIG. 1, direction X0 of antenna 11 is adjusted so as to perform communication with each of terminal station apparatus 2 to 4, based on directional pattern P. For example, in the fixed radio communication system of FIG. 1, base station apparatus 1 and terminal station apparatuses 2 to 4 perform radio communication with each other at a distance of about several tens of kilometers using a frequency of 400 KHz band.

When a new terminal station apparatus is installed in a state of the fixed radio communication system in FIG. 1, base station apparatus 1 of the exemplary embodiment have a configuration capable of adjusting the direction of antenna 11 so as to ensure the necessary channel quality of all the terminal station apparatuses present in a communication range including the new terminal station apparatus. The necessary channel quality means channel quality required by the terminal station apparatus.

Figure 2:
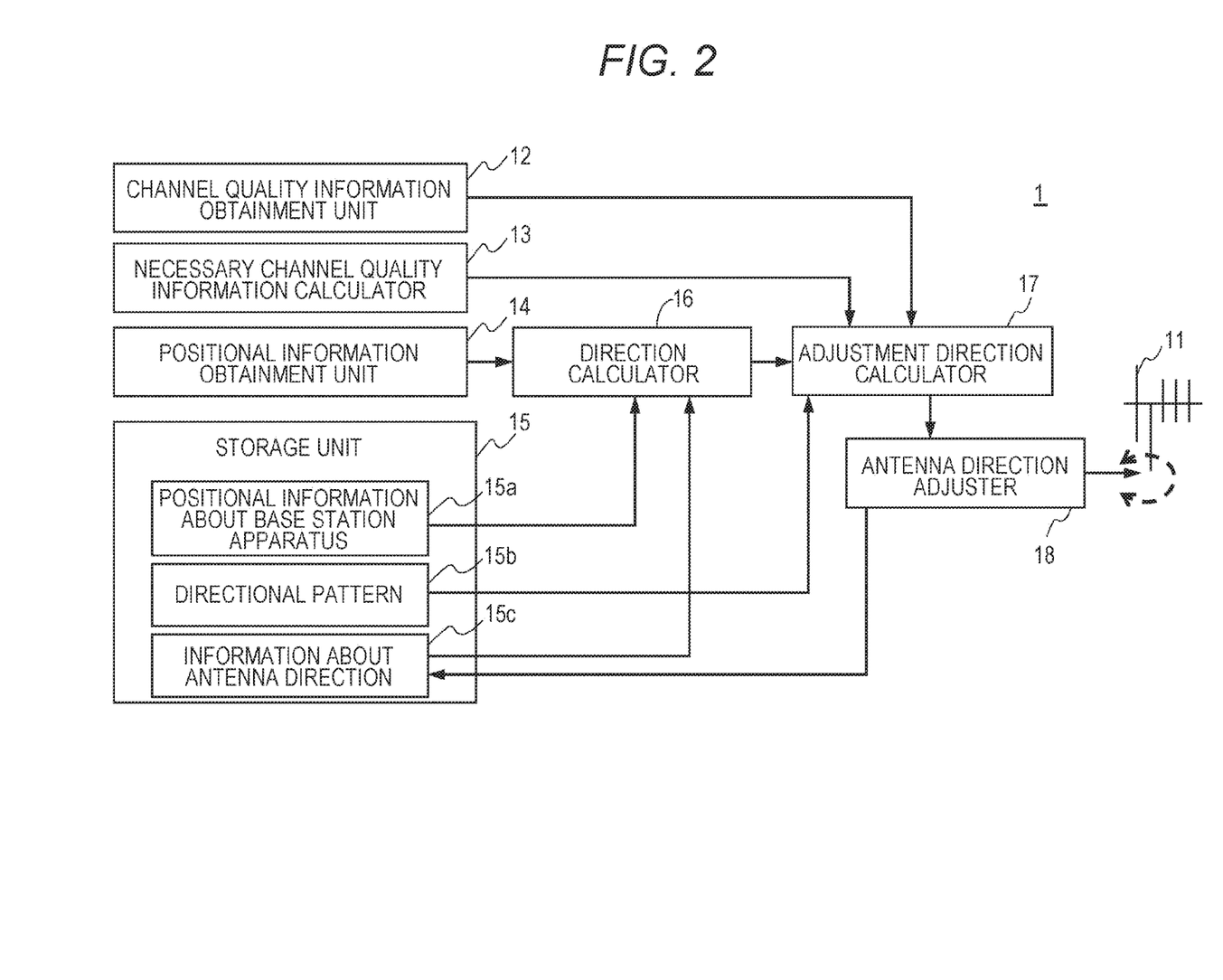
FIG. 2 is a diagram illustrating an example of configuration of a main-part of a base station apparatus according to the exemplary embodiment of the present invention.

A configuration of base station apparatus 1 of the exemplary embodiment will specifically be described below. FIG. 2 is a diagram illustrating an example of a main-part configuration of base station apparatus 1 of the exemplary embodiment. Base station apparatus 1 includes antenna 11, channel quality information obtainment unit 12, necessary channel quality information calculator 13, positional information obtainment unit 14, storage unit 15, direction calculator 16, adjustment direction calculator 17, and antenna direction adjuster 18.

Channel quality information obtainment unit 12 obtains channel quality information indicating current channel quality of each terminal station apparatus. For example, terminal station apparatus measures a current SINR (Signal to Interference plus Noise Ratio) between base station apparatus 1 and the terminal station apparatus, and transmits the measured SINR to base station apparatus 1 as the current channel quality information. Channel quality information obtainment unit 12 obtains the SINR received from terminal station apparatus as the channel quality information. The channel quality information may be information measured by an operator and the like of the fixed radio communication system.

Necessary channel quality information calculator 13 calculates necessary channel quality information indicating necessary channel quality that is channel quality required by each terminal station apparatus. For example, necessary channel quality information calculator 13 calculates the necessary channel quality from information about a number of necessary channels and a communication scheme with each terminal station apparatus; the number of necessary channels and the communication scheme with each terminal station apparatus are set by the operator and the like of the fixed radio communication system including base station apparatus 1.

Specifically, the information about the communication scheme means information (for example, a modulation index) about a modulation system that is adopted when base station apparatus 1 performs radio communication with the terminal station apparatus, information (for example, a coded rate) about a coding system, and information (for example, an error rate) about an error rate permissible in the system. Necessary channel quality information calculator 13 calculates, as the necessary channel quality, the necessary SINR, which is calculated from the modulation system and coded rate satisfying the number of necessary channels and the error rate permissible in the channel.

Positional information obtainment unit 14 obtains positional information about each of the plurality of terminal station apparatuses present in an area of base station apparatus 1. For example, the positional information about the terminal station apparatus is information about latitude and longitude of the terminal station apparatus, which is obtained from a GPS satellite. Positional information obtainment unit 14 outputs the obtained positional information about the terminal station apparatus to direction calculator 16. Positional information obtainment unit 14 may directly receive the positional information from the terminal station apparatus. Alternatively positional information obtainment unit 14 may obtain the positional information about the terminal station apparatus, which is set by the operator and the like of the fixed radio communication system.

Storage unit 15 stores information about the base station apparatus. For example, storage unit 15 stores positional information 15a about base station apparatus 1, directional pattern 15b (the information about directional pattern P in FIG. 1) of antenna 11 included in base station apparatus 1, and antenna direction information 15c indicating the direction of antenna 11 included in base station apparatus 1. For example, positional information 15a about base station apparatus 1 is information about latitude and longitude of base station apparatus 1, which is obtained from the GPS satellite. A radiation characteristic in each angle for the reference direction (for example, the front direction) of antenna 11 is fixed in directional pattern 15b. For example, antenna direction information 15c is information indicating the angle at which antenna 11 is oriented toward the front direction when a predetermined direction is set to zero.

Direction calculator 16 calculates the direction of the terminal station apparatus with the position of base station apparatus 1 as a reference, based on the positional information about the terminal station apparatus, positional information 15a about base station apparatus 1, and antenna direction information 15c about base station apparatus 1. Specifically, direction calculator 16 calculates the angle of the terminal station apparatus as seen from base station apparatus 1 with the current front direction of the antenna as a reference (zero) from latitude and longitude of the terminal station apparatus and latitude and longitude of base station apparatus 1. Direction calculator 16 outputs the calculated direction of the terminal station apparatus to adjustment direction calculator 17.

Adjustment direction calculator 17 calculates an adjustment direction of antenna 11 based on the channel quality information received from channel quality information obtainment unit 12, the necessary channel quality information received from necessary channel quality information calculator 13, directional pattern 15b of antenna 11, and the direction of the terminal station apparatus received from direction calculator 16.

Specifically, adjustment direction calculator 17 compares the current channel quality of each terminal station apparatus indicated by the channel quality information to the necessary channel quality indicated by the necessary channel quality information, in each terminal station apparatus. Adjustment direction calculator 17 determines that the direction of antenna 11 is adjusted when the current channel quality is lower than the necessary channel quality in at least one of the terminal station apparatuses.

When determining that the direction of antenna 11 is adjusted, adjustment direction calculator 17 calculates the adjustment direction of antenna 11 from directional pattern 15b of antenna 11 and the direction of each terminal station apparatus.

For example, adjustment direction calculator 17 determines the radiation characteristic of antenna 11 in the direction of each terminal station apparatus in changing the direction of antenna 11, based on directional pattern 15b. Adjustment direction calculator 17 calculates the direction of antenna 11, in which the radiation characteristic of antenna 11 satisfies the necessary channel quality of each terminal station apparatus in the direction of each terminal station apparatus, as the adjustment direction of antenna 11.

Antenna direction adjuster 18 adjusts the front direction of antenna 11 to the adjustment direction received from adjustment direction calculator 17. Antenna direction adjuster 18 updates antenna direction information 15c stored by storage unit 15, based on the post-adjustment antenna direction.

In the above configuration, base station apparatus 1 adjusts the direction of antenna 11.

Figure 3:
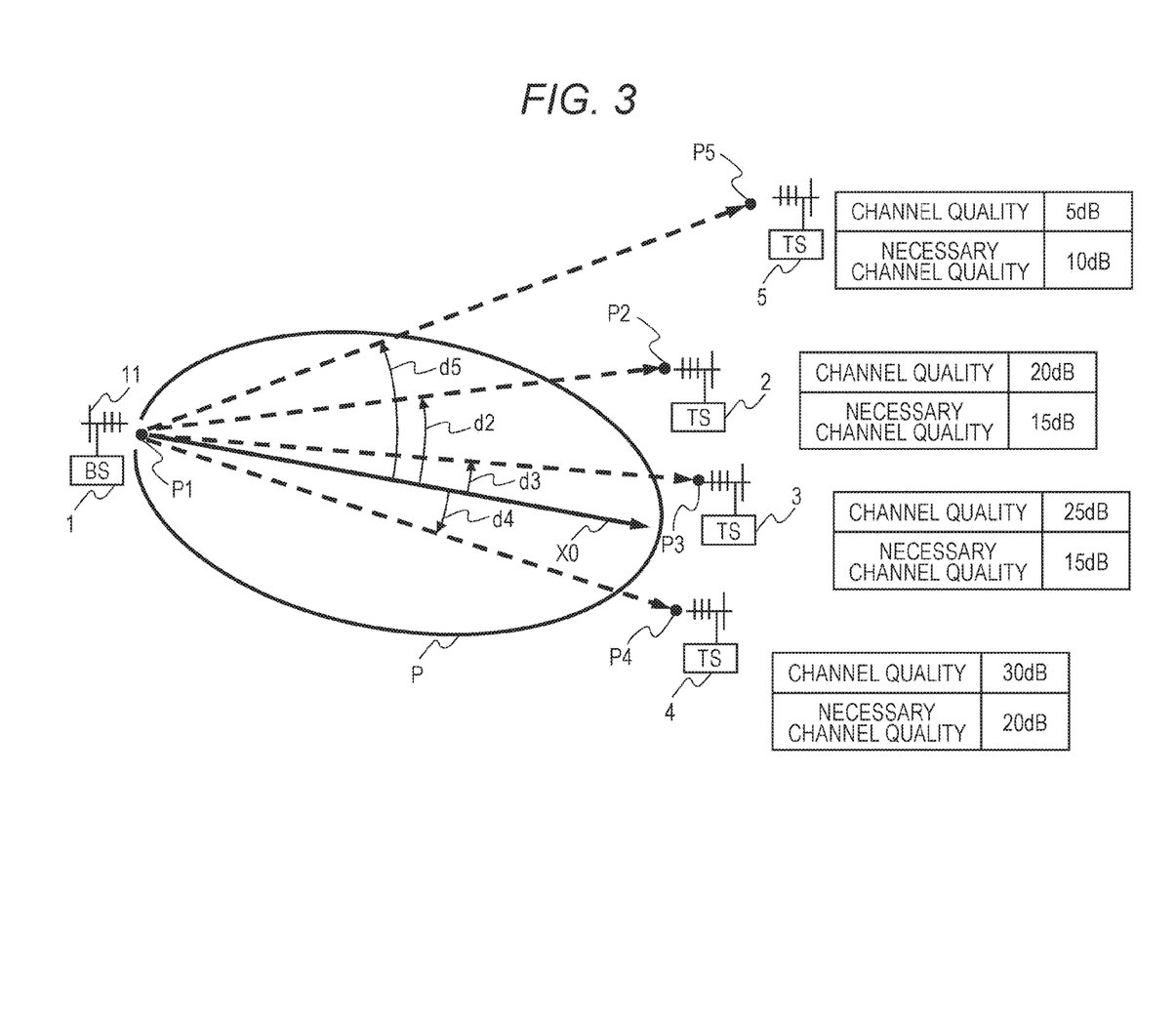
FIG. 3 is a diagram illustrating the state of the fixed radio communication system according to the exemplary embodiment of the present invention before an antenna direction is adjusted.

An example of the adjustment of the antenna direction in base station apparatus 1 will be described below with reference to FIGS. 3 and 4. FIG. 3 is a diagram illustrating the state of the fixed radio communication system according to the exemplary embodiment of the present invention before the antenna direction is adjusted.

Base station apparatus 1 and terminal station apparatuses 2 to 5 are illustrated in FIG. 3. In terminal station apparatuses 2 to 5, terminal station apparatuses 2 to 4 are a portable terminal station apparatus, which performs communication while already present in the communication range of base station apparatus 1. Terminal station apparatus 5 is a portable terminal station apparatus that is newly installed in the communication range of base station apparatus 1.

Base station apparatus 1 is a fixed base station apparatus of which the installation place is fixed. Antenna 11 is a directional antenna having directional pattern P. The front face of antenna 11 is oriented toward the direction of arrow X0. That is, for the example in FIG. 3, antenna 11 has directional pattern P in which the front direction (the direction of arrow X0) is the maximum radiation characteristic.

In FIG. 3, the position of base station apparatus 1 is illustrated by point P1, and the positions of terminal station apparatuses 2 to 5 are indicated by point P2 to point P5, respectively. FIG. 3 also illustrates the current channel quality and necessary channel quality of each of terminal station apparatuses 2 to 5. The current channel quality of each of terminal station apparatuses 2 to 5 is information obtained by channel quality information obtainment unit 12. The necessary channel quality of each of terminal station apparatuses 2 to 5 is information calculated by necessary channel quality information calculator 13.

As illustrated in FIG. 3, the current channel quality of each of terminal station apparatuses 2 to 4, which perform communication while being already present in the communication range of base station apparatus 1, is larger than or equal to the necessary channel quality. On the other hand, the current channel quality of terminal station apparatus 5 newly installed in the communication range of base station apparatus 1 is smaller than the necessary channel quality. In this case, base station apparatus 1 determines that the direction of antenna 11 is adjusted. Base station apparatus 1 adjusts the direction of antenna 11 such that the channel quality of terminal station apparatus 5 becomes larger than or equal to the necessary channel quality.

Direction calculator 16 of base station apparatus 1 calculates angles (d2 to d5 in FIG. 3) of terminal station apparatuses 2 to 5 as seen from base station apparatus 1 with arrow X0 as a reference, based on the pieces of positional information (pieces of information about points P2 to P5 in FIG. 3) about terminal station apparatuses 2 to 5, the positional information (information about point P1 in FIG. 3) about base station apparatus 1, and the antenna direction information (information about direction X0 in FIG. 3).

Adjustment direction calculator 17 of base station apparatus 1 calculates the adjustment direction of antenna 11 based on the channel quality information, the necessary channel quality information, directional pattern 15b of antenna 11, and the direction of the terminal station apparatus. Antenna direction adjuster 18 adjusts the front direction of antenna 11 to the adjustment direction calculated by adjustment direction calculator 17.

Figure 4:
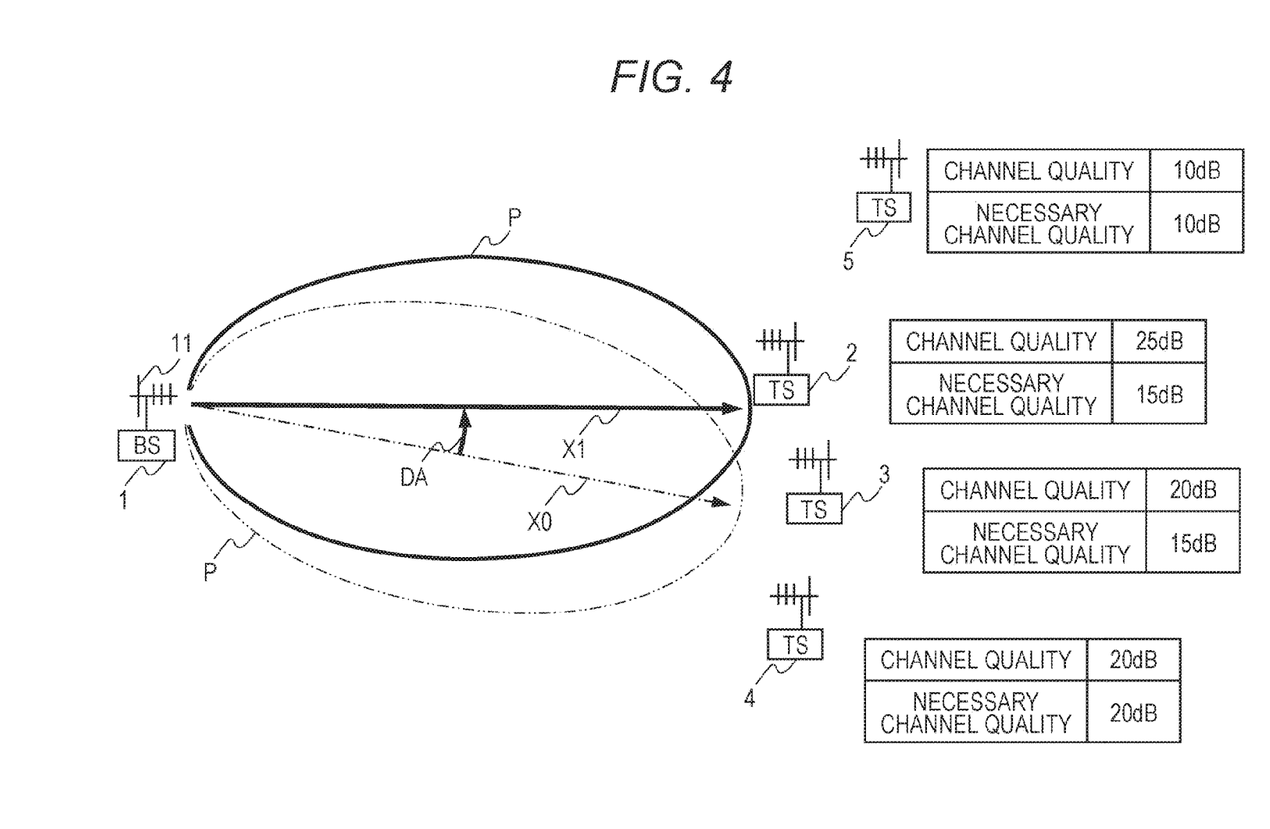
FIG. 4 is a diagram illustrating the state of the fixed radio communication system according to the exemplary embodiment of the present invention after the antenna direction is adjusted.

FIG. 4 is a diagram illustrating the state of the fixed radio communication system according to the exemplary embodiment of the present invention after the antenna direction is adjusted. In FIG. 4, the configuration identical to that in FIG. 3 is designated by the identical numeral, and the description will be omitted.

In FIG. 4, arrow DA indicates a displacement amount from the pre-adjustment antenna direction (arrow X0) to the adjustment direction (arrow X1) calculated by adjustment direction calculator 17. Arrow X1 indicates the front direction of antenna 11 after the antenna direction is adjusted.

As illustrated in FIGS. 3 and 4, when the antenna direction is adjusted from arrow X0 to arrow X1, the channel quality of terminal station apparatus 5 becomes larger than or equal to the necessary channel quality. The channel quality of each of terminal station apparatuses 2 to 4 is maintained at the necessary channel quality.

Figure 5:
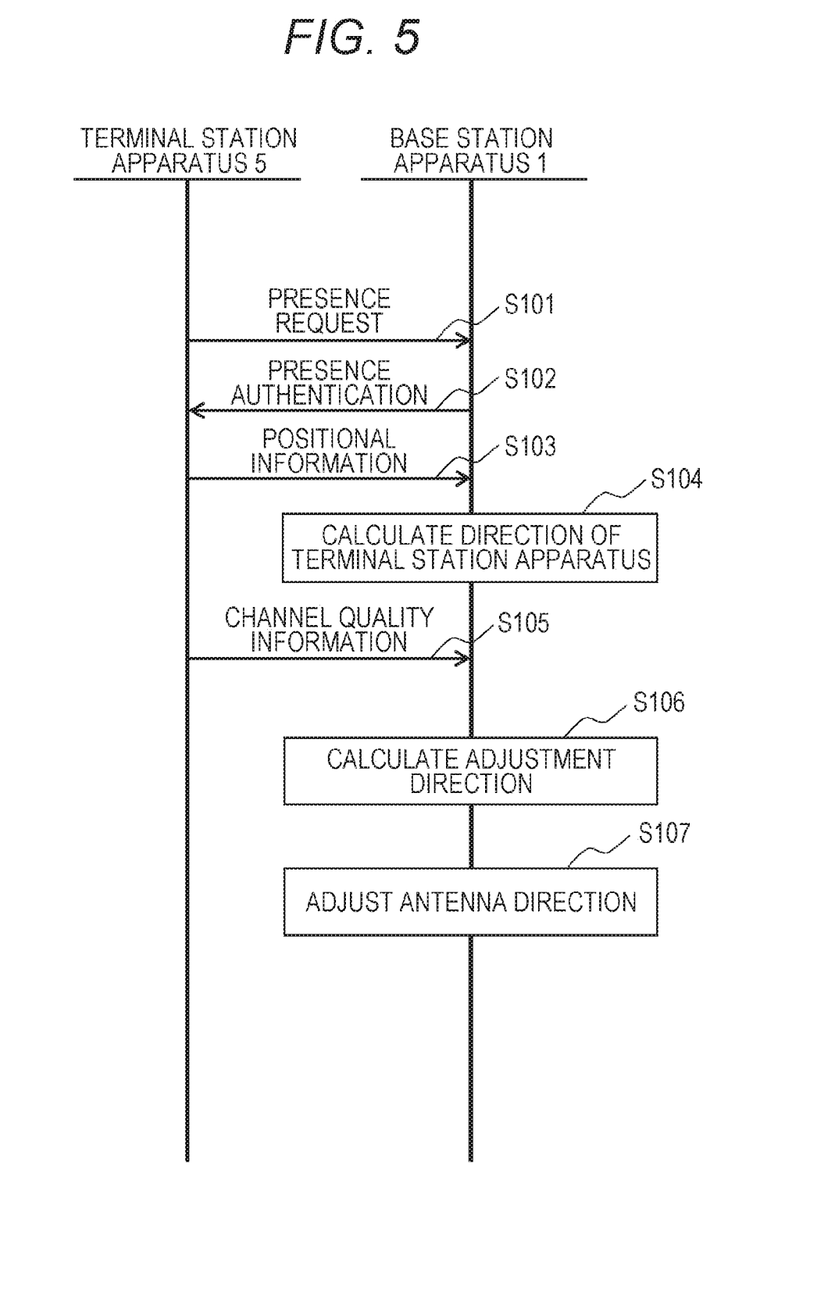
FIG. 5 is a sequence diagram illustrating a procedure of antenna direction adjustment processing according to the exemplary embodiment of the present invention.

A procedure for antenna direction adjustment processing performed between base station apparatus 1 and terminal station apparatus 5 newly provided in the communication range of base station apparatus 1 will be described below. FIG. 5 is a sequence diagram illustrating the procedure of the antenna direction adjustment processing in the exemplary embodiment of the present invention.

When terminal station apparatus 5 is provided at a new position in the communication range of base station apparatus 1, terminal station apparatus 5 transmits a presence request to communicate with base station apparatus 1 to base station apparatus 1. A presence request processor (not illustrated) of base station apparatus 1 receives the presence request (S101).

When receiving the presence request from terminal station apparatus 5, the presence request processor (not illustrated) of base station apparatus 1 transmits, to terminal station apparatus 5, presence authentication indicating that terminal station apparatus 5 authenticates that base station apparatus 1 performs communication in the communication range of base station apparatus 1 (S102).

When receiving the presence authentication from base station apparatus 1, terminal station apparatus 5 transmits positional information indicating the position of terminal station apparatus 5 to base station apparatus 1. Direction calculator 16 of base station apparatus 1 receives the positional information indicating the position of terminal station apparatus 5 (S103). For example, the positional information transmitted from terminal station apparatus 5 is information about latitude and longitude indicating position of terminal station apparatus 5, which is obtained from the GPS satellite.

Direction calculator 16 of base station apparatus 1 calculates the direction of terminal station apparatus 5 based on the positional information received from terminal station apparatus 5, the positional information about base station apparatus 1, and the antenna direction information about base station apparatus 1 (S104).

Then, terminal station apparatus 5 transmits the channel quality information indicating the current channel quality to base station apparatus 1 (S105).

Adjustment direction calculator 17 of base station apparatus 1 calculates the adjustment direction (the direction toward which the directional antenna should be oriented) of antenna 11 (S106). Specifically when the orientation of antenna 11 is changed (when the angle is changed from the current direction X0 of the antenna), adjustment direction calculator 17 can calculate the channel quality of each of terminal station apparatuses 2 to 5 from the current orientation of antenna 11, the current channel quality of each of terminal station apparatus 2 to 5, and the directional pattern of antenna 11 as illustrated in FIG. 3. Using the channel quality of each of terminal station apparatuses 2 to 5 in FIG. 4 in calculation results, the antenna orientation (angle DA) that becomes larger than or equal to the necessary channel quality can be calculated as the adjustment direction (the direction toward which the directional antenna should be oriented), for example.

Antenna direction adjuster 18 of base station apparatus 1 adjusts the direction of antenna 11 to the adjustment direction calculated in S106 (S107). Specifically for example, when antenna 11 is a Yagi antenna, antenna 11 is physically oriented toward the adjustment direction calculated in S106. For example, as illustrated in FIG. 4, antenna 11 is physically rotated by angle DA. Depending on a kind of the antenna, the directivity is electrically adjusted to change the orientation of the directivity of the antenna, which allows the antenna to be oriented toward the adjustment direction calculated in S106.

Through the above processing, base station apparatus 1 adjusts the direction of antenna 11.

In the above exemplary embodiment, the base station apparatus can properly adjust the antenna direction in the point-to-multi point fixed radio communication system including the base station apparatus having the directional antenna and the plurality of portable terminal station apparatuses.

In the above exemplary embodiment, the antenna direction of the base station apparatus is adjusted while that the channel quality is not lower than the necessary channel quality is checked in each terminal station apparatus, so that the minimum number of channels necessary for each present terminal station apparatus can be ensured and the channel can be maintained without disconnecting the channel.

In the above exemplary embodiment, the terminal station apparatus transmits the positional information when receiving the presence authentication from the base station apparatus. However, the timing the terminal station apparatus transmits the positional information is not limited to the exemplary embodiment. The positional information about the terminal station apparatus is not transmitted from the terminal station apparatus, but may be set by the operator and the like of the system.

In the description of the above exemplary embodiment, the configuration in which the necessary channel quality is calculated from the necessary number of channels set by the operator and the like of the system. The operator and the like of the system do not set the necessary number of channels, but may directly set the necessary channel quality. In this case, the base station apparatus needs not to include the necessary channel quality information calculator.

In the description of the above exemplary embodiment, the necessary channel quality of each terminal station apparatus is calculated using the necessary number of channels of the terminal station apparatus. However, the present invention is not limited to the exemplary embodiment. The necessary channel quality may be calculated using an indicator different from the number of necessary channels. The indicator used to calculate the necessary channel quality may be set by the operator and the like of the system.

For example, the necessary channel quality of each terminal station apparatus may be calculated using necessary throughput indicating a transmission speed required by each terminal station apparatus. In this case, the base station apparatus adjusts the antenna direction such that the channel quality of each terminal station apparatus becomes larger than or equal to the necessary channel quality calculated using the necessary throughput. The configuration can ensure the reception quality of video data when the terminal station apparatus receives the video data from the base station apparatus and displays the received data in real time.

The necessary channel quality of each terminal station apparatus may be calculated using the necessary number of voice channels required by each terminal station apparatus. In this case, the base station apparatus adjusts the antenna direction such that the channel quality of each terminal station apparatus becomes larger than or equal to the necessary channel quality calculated using the necessary number of voice channels. The configuration can ensure the number of voice channels when the terminal station apparatus mainly transmits and receives voice traffic such as a voice call.

The necessary channel quality of each terminal station apparatus may be calculated using the number of emergency communication channels used during emergency communication in each terminal station apparatus. In this case, the base station apparatus adjusts the antenna direction such that the channel quality of each terminal station apparatus becomes larger than or equal to the necessary channel quality calculated using the number of emergency communication channels. The configuration can ensure the number of emergency communication channels minimum during the emergency communication such as a disaster in the current channels of the terminal station apparatuses.

The necessary channel quality of each terminal station apparatus may be calculated using a total number of accommodation channels that is of the maximum number of channels that can be accommodated in the base station apparatus. For example, when a sum of the current channels of the terminal station apparatuses is smaller than the number of accommodation channels, the antenna direction is adjusted such that the sum becomes the number of accommodation channels. The configuration can distribute the channels to the terminal station apparatuses as many as possible because the channels can be shared with the terminal station apparatuses when the base station apparatus has a margin of the number of accommodation channels.

In the description of the above exemplary embodiment, the necessary channel quality information calculator calculates the necessary channel quality of each terminal station apparatus using the necessary number of channels. However, the present invention is not limited to the exemplary embodiment. The necessary channel quality information calculator may change an indicator for each terminal station apparatus, and calculate the necessary channel quality of each terminal station apparatus based on a different indicator for each terminal station apparatus.

For example, the necessary channel quality of at least one of the terminal station apparatuses may be calculated using the necessary number of channels, and the necessary channel quality of each of other terminal station apparatuses may be calculated using the necessary throughput. A freedom degree of the adjustment of the antenna direction can be improved in the base station apparatus by separately setting the indicator used to calculate the necessary channel quality in each terminal station apparatus.

In the description of the above exemplary embodiment, the base station apparatus adjusts the antenna direction such that the channel quality of each terminal station apparatus becomes larger than or equal to the necessary channel quality. However, the present invention is not limited to the exemplary embodiment. For example, a priority indicating the terminal station apparatus in which the channel should preferentially be ensured may be set to each terminal station apparatus. In this case, the base station apparatus adjusts the antenna direction such that the channel quality of the terminal station apparatus having a higher priority becomes larger than or equal to the necessary channel quality. In the configuration, the base station apparatus can preferentially maintain the necessary number of channels of the terminal station apparatus having the high priority when the sum of the necessary channels of the terminal station apparatus is larger than the number of channels that can be accommodated in the base station apparatus.

In the description of the above exemplary embodiment, the antenna of the base station apparatus has the directional pattern in which the highest radiation characteristic is obtained in the front direction. However, the present invention is not limited to the exemplary embodiment.

In the description of the above exemplary embodiment, the base station apparatus adjusts only the antenna direction. Alternatively in the present invention, the base station apparatus may adjust the directional pattern of the antenna.

For example, the base station apparatus may widen the directional pattern based on the direction of the terminal station apparatus, and radiate the radio wave in a wide range.

In the description of the above exemplary embodiment, the present invention is constructed with hardware by way of example. Alternatively the present invention can be implemented by software in cooperation with hardware.

Each functional block used in the exemplary embodiment is typically constructed with an LSI that is an integrated circuit. Each functional block may individually be integrated into one chip, or some or all of the functional blocks may be integrated into one chip. In this case, the term of LSI is used. The LSI is also called an IC, a system LSI, a super LSI, and an ultra LSI depending on a degree of integration.

A technique of implementing the integrated circuit is not limited to the LSI, but implementation by a dedicated circuit or a general-purpose processor may be used. A field programmable gate array (FPGA) in which programming can be performed after LSI fabrication or a reconfigurable processor that can reconfigure connections and settings of circuit cells in the LSI may also be used in implementing the integrated circuit.

When an integrated circuit technology replacing the LSI by the progress of the semiconductor technology or another technology derived from the semiconductor technology emerges, the function block may be integrated using the integrated circuit technology. For example, application of biotechnology is possible.

As described above, the base station apparatus of the exemplary embodiment of the present invention is the base station apparatus in the point-to-multi point radio communication system in which the base station apparatus and the plurality of terminal station apparatuses communicate with each other. The base station apparatus includes a directional antenna, a terminal station apparatus direction calculator, an antenna direction calculator, and an antenna direction adjuster. The directional antenna has directivity. The terminal station apparatus direction calculator calculates directions of the plurality of terminal station apparatuses relative to a position of the base station apparatus based on positions of the plurality of terminal station apparatuses and the position of the base station apparatus. The antenna direction calculator calculates a direction toward which the directional antenna should be oriented based on directions of the plurality of terminal station apparatuses, channel quality of each of the plurality of terminal station apparatuses, necessary channel quality indicating the channel quality required by each of the plurality of terminal station apparatuses, and a directional pattern of the directional antenna. The antenna direction adjuster orients the directional antenna toward the calculated direction toward which the directional antenna should be oriented.

In the base station apparatus of the exemplary embodiment of the present invention, the base station apparatus can properly adjust the antenna direction in the point-to-multi point radio communication system including the base station apparatus having the directional antenna and the plurality of terminal station apparatuses.

The antenna direction calculator may calculate the direction toward which the directional antenna should be oriented, based on the direction in which the directional pattern has the largest radiation characteristic.

The antenna direction calculator may compare the channel quality to the necessary channel quality with respect to each of the plurality of terminal station apparatuses, and calculate the direction toward which the directional antenna should be oriented such that the channel quality becomes larger than or equal to the necessary channel quality in each of all the plurality of terminal station apparatuses.

The base station apparatus may further include a necessary channel quality information calculator. The necessary channel quality information calculator calculates the necessary channel quality based on one of indicators of a number of channels required by the plurality of terminal station apparatuses, throughput required by the plurality of terminal station apparatuses, a number of voice channels required by the plurality of terminal station apparatuses, and a number of emergency channels required by the plurality of terminal station apparatuses and based on information about a communication scheme of the plurality of terminal station apparatuses.

The necessary channel quality information calculator may change the necessary channel quality for each of the plurality of terminal station apparatuses.

A priority may be set to each of the plurality of terminal station apparatuses. The antenna direction calculator calculates the direction toward which the directional antenna should be oriented such that the channel quality becomes larger than or equal to the necessary channel quality in each of the plurality of terminal station apparatuses having the priority higher than a predetermined priority.

The base station apparatus control method of the exemplary embodiment of the present invention is the base station apparatus control method in the point-to-multi point radio communication system in which the base station apparatus including the directional antenna having the directivity and the plurality of terminal station apparatuses communicate with each other. The control method includes calculating directions of the plurality of terminal station apparatuses relative to a position of the base station apparatus based on positions of the plurality of terminal station apparatuses and the position of the base station apparatus. The control method includes calculating a direction toward which the directional antenna should be oriented based on directions of the plurality of terminal station apparatuses, channel quality of each of the plurality of terminal station apparatuses, necessary channel quality indicating the channel quality required by each of the plurality of terminal station apparatuses, and a directional pattern of the directional antenna. The control method includes orienting the directional antenna toward the calculated direction toward which the directional antenna should be oriented.

In the base station apparatus control method of the exemplary embodiment of the present invention, the base station apparatus can properly adjust the antenna direction in the point-to-multi point radio communication system including the base station apparatus having the directional antenna and the plurality of terminal station apparatuses.

INDUSTRIAL APPLICABILITY

The present invention is useful for the base station apparatus and the control method therefor in the point-to-multi point radio communication system.

REFERENCE MARKS IN THE DRAWINGS

1 base station apparatus
2, 3, 4, 5 terminal station apparatus
11, 21, 31, 41 antenna
12 channel quality information obtainment unit
13 necessary channel quality information calculator
14 positional information obtainment unit
15 storage unit
16 direction calculator (terminal station apparatus direction calculator)
17 adjustment direction calculator (antenna direction calculator)
18 antenna direction adjuster

The invention claimed is:
1. A base station apparatus in a point-to-multi point radio communication system in which the base station apparatus and a plurality of terminal station apparatuses communicate with each other, the base station apparatus comprising:
a directional antenna having directivity;
a terminal station apparatus direction calculator, which, in operation, calculates directions of the plurality of terminal station apparatuses relative to a position of the base station apparatus based on positions of the plurality of terminal station apparatuses and the position of the base station apparatus;
an antenna direction calculator, which, in operation, calculates a direction toward which the directional antenna should be oriented based on the directions of the plurality of terminal station apparatuses, channel quality of each of the plurality of terminal station apparatuses, necessary channel quality indicating the channel quality required by each of the plurality of terminal station apparatuses, and a directional pattern of the directional antenna; and
an antenna direction adjuster, which, in operation, orients the directional antenna toward the direction toward which the directional antenna should be oriented.

2. The base station apparatus according to claim 1, wherein the antenna direction calculator calculates the direction toward which the directional antenna should be oriented based on a direction in which the directional pattern has a largest radiation characteristic.

3. The base station apparatus according to claim 1, wherein the antenna direction calculator, in operation,
compares the channel quality to the necessary channel quality with respect to each of the plurality of terminal station apparatuses, and calculates the direction toward which the directional antenna should be oriented such that the channel quality becomes larger than or equal to the necessary channel quality in each of the plurality of terminal station apparatuses.

4. The base station apparatus according to claim 1, further comprising a necessary channel quality information calculator, which, in operation, calculates the necessary channel quality based on one of indicators of a number of channels required by the plurality of terminal station apparatuses, throughput required by the plurality of terminal station apparatuses, a number of voice channels required by the plurality of terminal station apparatuses, and a number of emergency channels required by the plurality of terminal station apparatuses, and based on information about a communication scheme of the plurality of terminal station apparatuses.

5. The base station apparatus according to claim 4, wherein the necessary channel quality information calculator, in operation, changes the necessary channel quality for each of the plurality of terminal station apparatuses.

6. The base station apparatus according to claim 1, wherein
a priority is set to each of the plurality of terminal station apparatuses, and
the antenna direction calculator calculates the direction toward which the directional antenna should be oriented such that the channel quality becomes larger than or equal to the necessary channel quality in each of the plurality of terminal station apparatuses having a priority higher than a predetermined priority.

7. The base station apparatus according to claim 2, wherein the antenna direction calculator, in operation,
compares the channel quality to the necessary channel quality with respect to each of the plurality of terminal station apparatuses, and
calculates the direction toward which the directional antenna should be oriented such that the channel quality becomes larger than or equal to the necessary channel quality in each of the plurality of terminal station apparatuses.

8. The base station apparatus according to claim 2, further comprising a necessary channel quality information calculator, which, in operation, calculates the necessary channel quality based on one of indicators of a number of channels required by the plurality of terminal station apparatuses, throughput required by the plurality of terminal station apparatuses, a number of voice channels required by the plurality of terminal station apparatuses, and a number of emergency channels required by the plurality of terminal station apparatuses, and based on information about a communication scheme of the plurality of terminal station apparatuses.

9. The base station apparatus according to claim 3, further comprising a necessary channel quality information calculator, which, in operation, calculates the necessary channel quality based on one of indicators of a number of channels required by the plurality of terminal station apparatuses, throughput required by the plurality of terminal station apparatuses, a number of voice channels required by the plurality of terminal station apparatuses, and a number of emergency channels required by the plurality of terminal station apparatuses, and based on information about a communication scheme of the plurality of terminal station apparatuses.

10. The base station apparatus according to claim 2, wherein
a priority is set to each of the plurality of terminal station apparatuses, and
the antenna direction calculator calculates the direction toward which the directional antenna should be oriented such that the channel quality becomes larger than or equal to the necessary channel quality in each of the plurality of terminal station apparatuses having a priority higher than a predetermined priority.

11. The base station apparatus according to claim 7, further comprising a necessary channel quality information calculator, which, in operation, calculates the necessary channel quality based on one of indicators of a number of channels required by the plurality of terminal station apparatuses, throughput required by the plurality of terminal station apparatuses, a number of voice channels required by the plurality of terminal station apparatuses, and a number of emergency channels required by the plurality of terminal station apparatuses, and based on information about a communication scheme of the plurality of terminal station apparatuses.

12. The base station apparatus according to claim 11, wherein the necessary channel quality information calculator, in operation, changes the necessary channel quality for each of the plurality of terminal station apparatuses.

13. The base station apparatus according to claim 8, wherein the necessary channel quality information calculator, in operation, changes the necessary channel quality for each of the plurality of terminal station apparatuses.

14. The base station apparatus according to claim 9, wherein the necessary channel quality information calculator, in operation, changes the necessary channel quality for each of the plurality of terminal station apparatuses.

15. A base station apparatus control method in a point-to-multi point radio communication system in which a base station apparatus including a directional antenna having directivity and a plurality of terminal station apparatuses communicate with each other, the base station apparatus control method comprising:
calculating, by the base station apparatus, directions of the plurality of terminal station apparatuses relative to a position of the base station apparatus based on positions of the plurality of terminal station apparatuses and the position of the base station apparatus;
calculating, by the base station apparatus, a direction toward which the directional antenna should be oriented based on the directions of the plurality of terminal station apparatuses, channel quality of each of the plurality of terminal station apparatuses, necessary channel quality indicating the channel quality required by each of the plurality of terminal station apparatuses, and a directional pattern of the directional antenna; and
orienting, by the base station apparatus, the directional antenna toward the direction toward which the directional antenna should be oriented.

* * * * *